(12) United States Patent
Huang et al.

(10) Patent No.: US 10,937,386 B2
(45) Date of Patent: Mar. 2, 2021

(54) COLOR CALIBRATOR

(71) Applicant: BENQ CORPORATION, Taipei (TW)

(72) Inventors: Liu-Yi Huang, New Taipei (TW);
Hsin-Nan Lin, New Taipei (TW);
Wei-Chung Hsu, New Taipei (TW);
Ping Li, Taipei (TW); Ta-Yuan Lee,
New Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 16/362,779

(22) Filed: Mar. 25, 2019

(65) Prior Publication Data

US 2019/0295502 A1 Sep. 26, 2019

(30) Foreign Application Priority Data

Mar. 26, 2018 (CN) .......................... 201810251314.7

(51) Int. Cl.
| | |
|---|---|
| *G09G 5/02* | (2006.01) |
| *G01J 3/50* | (2006.01) |
| *G01J 3/02* | (2006.01) |
| *G09G 3/00* | (2006.01) |
| *G02F 1/13* | (2006.01) |

(52) U.S. Cl.
CPC .............. *G09G 5/02* (2013.01); *G01J 3/0291*
(2013.01); *G01J 3/506* (2013.01); *G02F 1/1309* (2013.01); *G09G 3/006* (2013.01); *G09G 2320/0242* (2013.01); *G09G 2320/0666* (2013.01); *G09G 2320/0693* (2013.01); *G09G 2320/08* (2013.01); *G09G 2354/00* (2013.01)

(58) Field of Classification Search
CPC ........ G01J 3/0291; G01J 3/506; G09G 3/006; G09G 5/02
See application file for complete search history.

(56) References Cited

U.S. PATENT DOCUMENTS

| | | | |
|---|---|---|---|
| 6,320,652 B1 | 11/2001 | Morimoto et al. | |
| 2003/0058448 A1 | 3/2003 | Merle et al. | |
| 2008/0204437 A1 | 8/2008 | Jensen | |
| 2008/0294298 A1 | 11/2008 | Park | |
| 2011/0019191 A1 | 1/2011 | Hsu et al. | |
| 2016/0005343 A1* | 1/2016 | Lee | .......................... F16B 47/00 348/191 |

FOREIGN PATENT DOCUMENTS

| | | |
|---|---|---|
| CN | 103562981 B | 11/2015 |
| DE | 202006007084 U1 | 9/2007 |

OTHER PUBLICATIONS

Office action of counterpart application by European Patent Office dated Jul. 17, 2017.
Office action of counterpart application by Taiwan IP Office dated Jan. 23, 2019.

* cited by examiner

*Primary Examiner* — Charles Tseng

(57) ABSTRACT

A color calibrator used to correct the display color of a display device is provided. The color calibrator includes a color correction module, a cover and a combiner. The color correction module includes a color correction unit for correcting the display color. The cover is connected to the color correction module to selectively expose or cover the color correction unit. The combiner is disposed on the cover, and the combiner is connected to the display device when the cover exposes the color correction unit.

17 Claims, 7 Drawing Sheets

COLOR CALIBRATOR

This application claims the benefit of People's Republic of China application Serial No. 201810251314.7, filed on Mar. 26, 2018, the subject matter of which is incorporated herein by reference.

BACKGROUND OF THE INVENTION

Field of the Invention

The invention relates in general to a color calibrator, and more particularly to a color calibrator with a combiner.

Description of the Related Art

Normally, the conventional color calibrator includes a color correction module, a connection wire and a clump weight, wherein the connection wire connects the color correction module and the clump weight. When color correction is performed, the color correction module is opposite to the display surface of the display device, the connection wire crosses over the top of the display device, and the clump weight is hanged at the opposite side (the rear side) of the display device. The clump weight may affect the storage performance of the color calibrator, and during the process of color correction, the clump weight may sway and make the color correction module unstable.

SUMMARY OF THE INVENTION

The invention is directed to a color calibrator capable of resolving the above problems.

According to one embodiment of the present invention, a color calibrator is provided. The color calibrator is used to correct the display color of a display device. The color calibrator includes a color correction module, a cover and a combiner. The color correction module includes a color correction unit for correcting the display color. The cover is connected to the color correction module to selectively expose or cover the color correction unit. The combiner is disposed on the cover, and the combiner is connected to the display device when the cover exposes the color correction unit.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
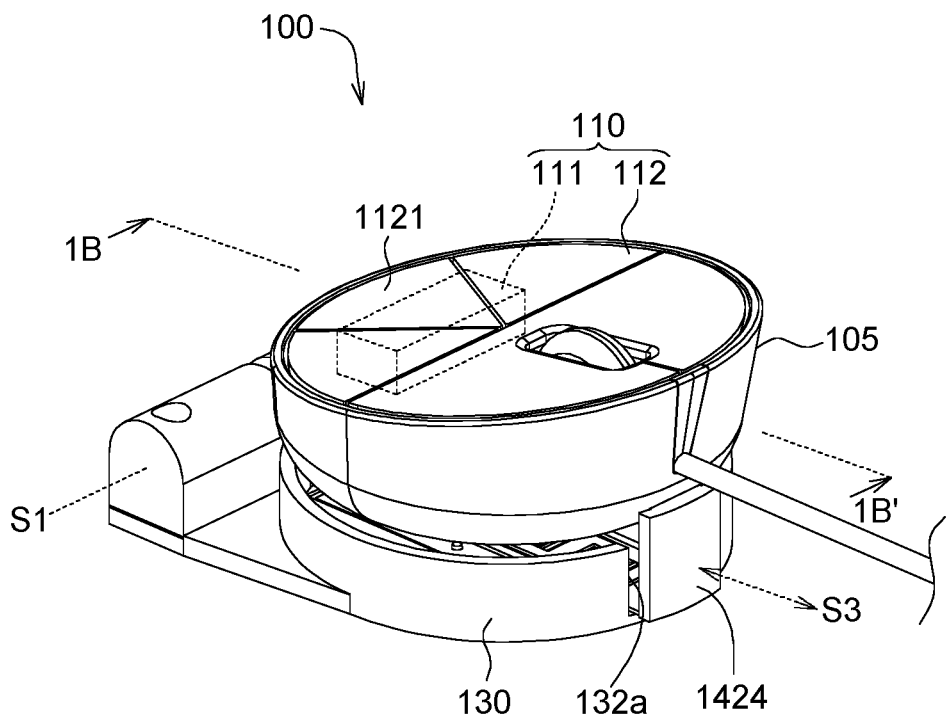
FIG. 1A is a schematic diagram of a color calibrator in a closed state according to an embodiment of the present disclosure.
Figure 1B:
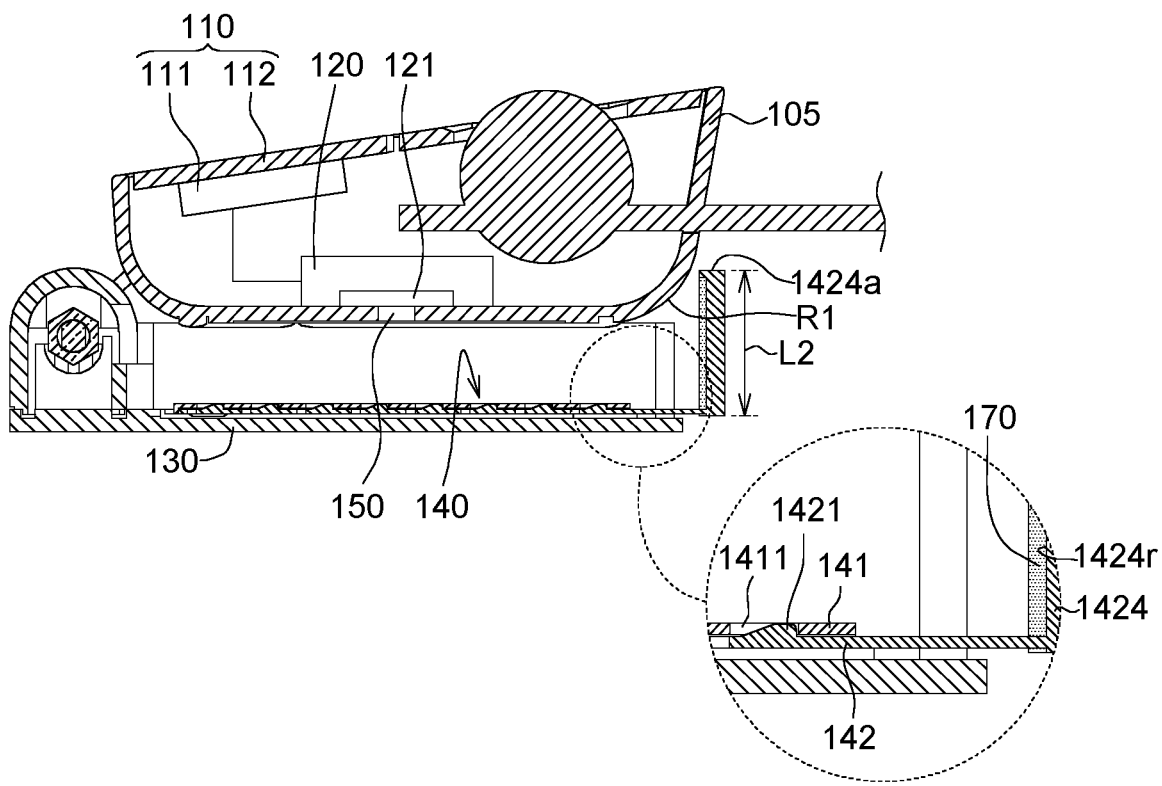
FIG. 1B is a cross-sectional view of the color calibrator of FIG. 1A along a direction 1B-1B'.
Figure 2A:
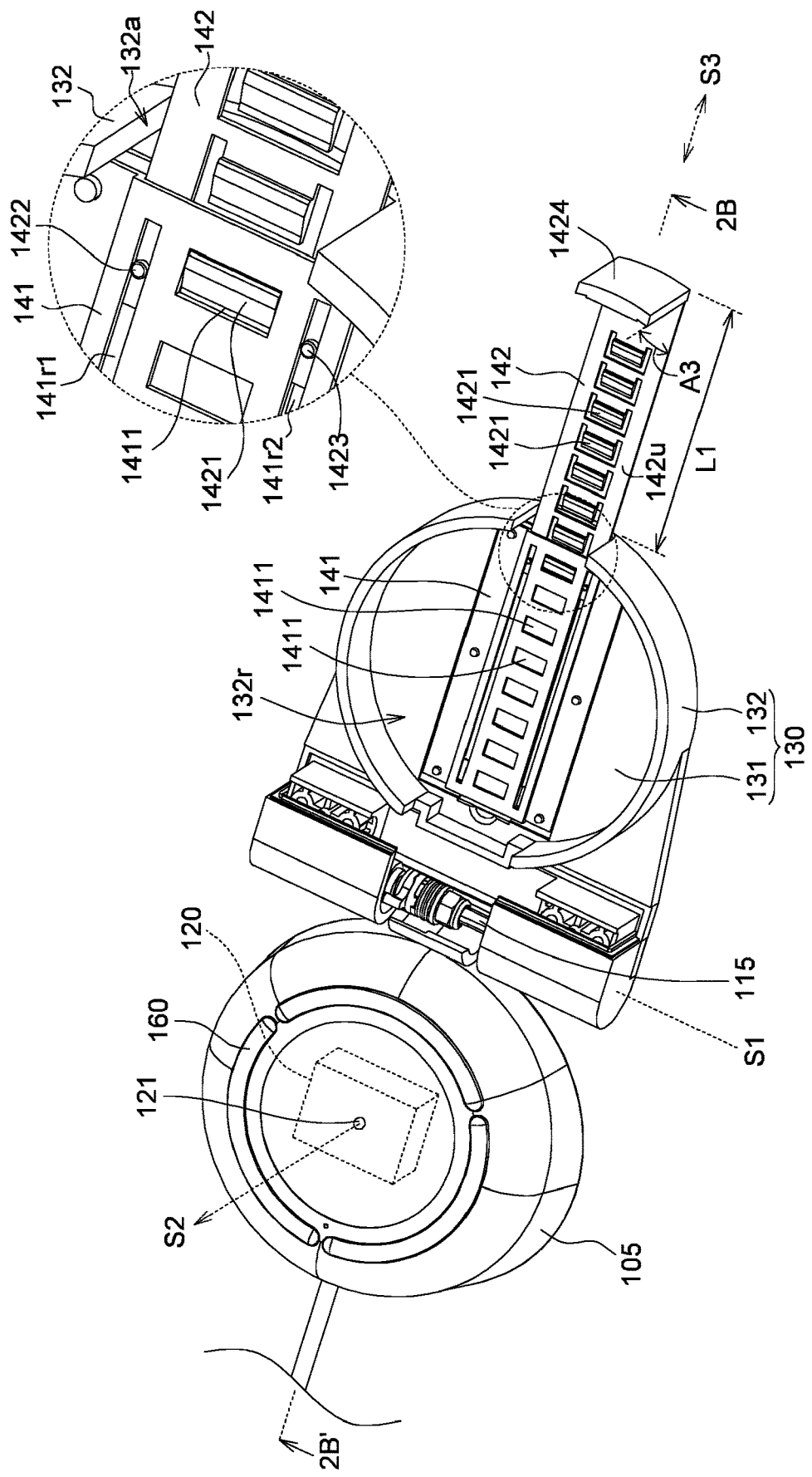
FIG. 2A is a schematic diagram of the color calibrator of FIG. 1A in an open state.
Figure 2B:
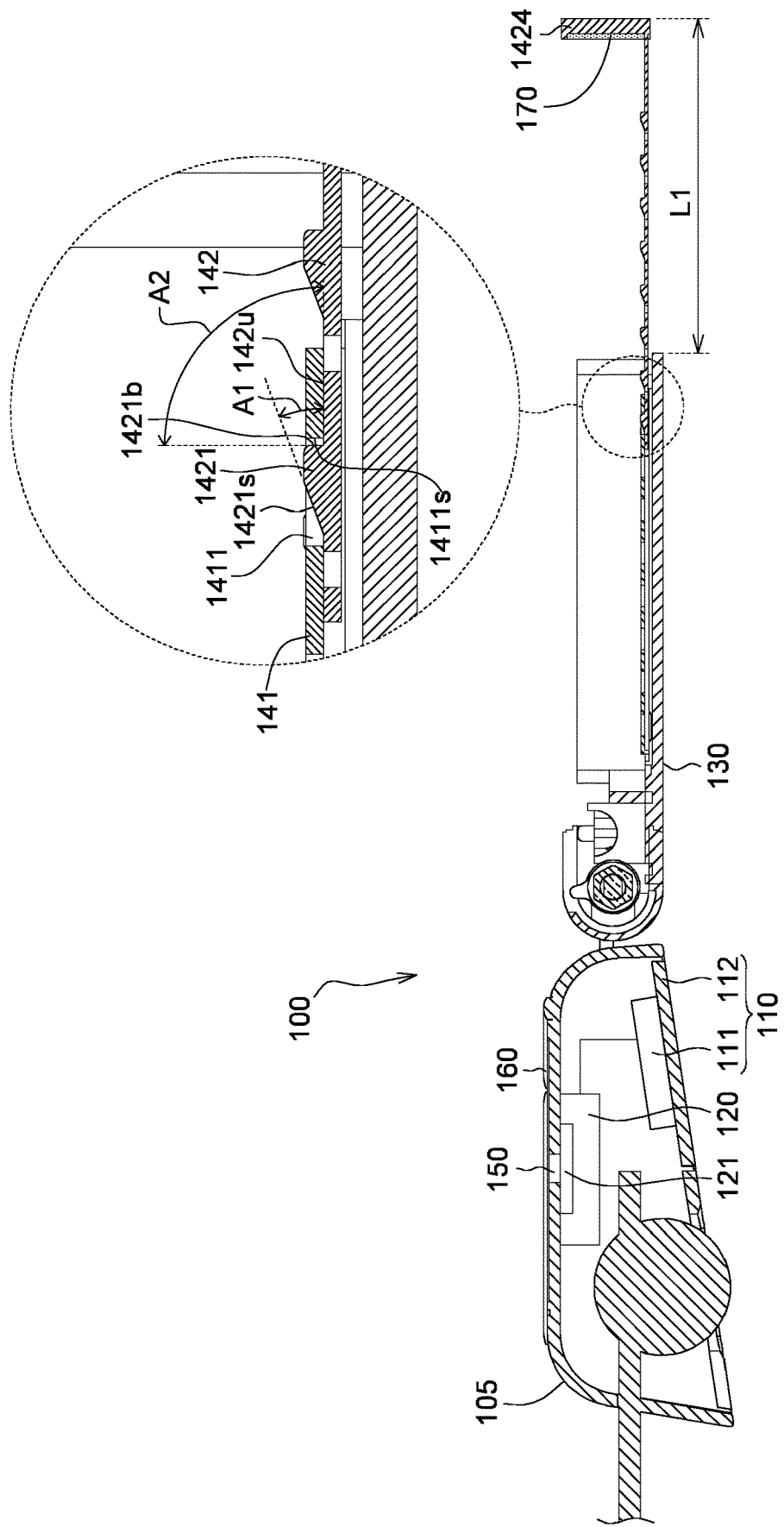
FIG. 2B is a cross-sectional view of the color calibrator of FIG. 2A along a direction 2B-2B'.
Figure 3:
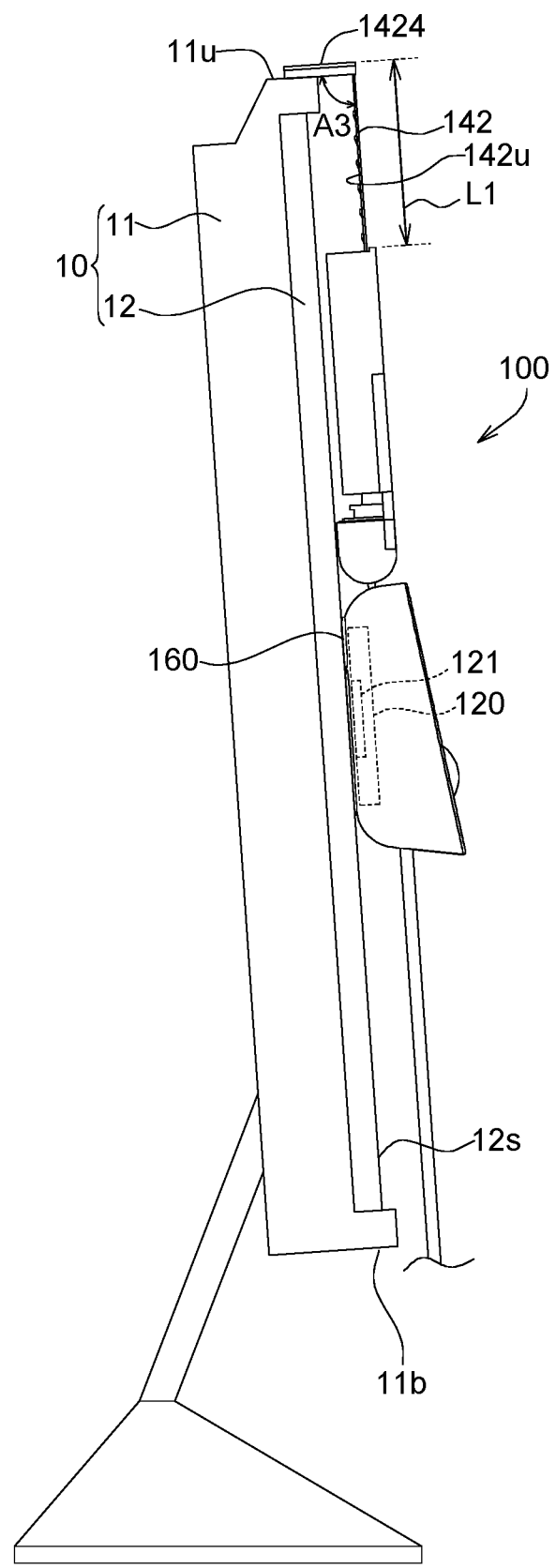
FIG. 3 is a schematic diagram of the color calibrator of FIG. 2A connected to a display device.

Refer to FIGS. 1A~3. FIG. 1A is a schematic diagram of a color calibrator 100 in a closed state according to an embodiment of the present disclosure. FIG. 1B is a cross-sectional view of the color calibrator 100 of FIG. 1A along a direction 1B-1B'. FIG. 2A is a schematic diagram of the color calibrator 100 of FIG. 1A in an open state. FIG. 2B is a cross-sectional view of the color calibrator 100 of FIG. 2A along a direction 2B-2B'. FIG. 3 is a schematic diagram of the color calibrator 100 of FIG. 2A connected to a display device 10.

As indicated in FIGS. 1A~1B, the color calibrator 100 is used to correct the display color of the display device 10 (illustrated in FIG. 3). The color calibrator 100 includes a casing 105, a control module 110, a color correction module 120, a cover 130, a combiner 140, a lens 150, a first anti-slip pad 160 and a second anti-slip pad 170.

As indicated in FIGS. 2A and 2B, the color correction module 120 includes a color correction unit 121 for correcting the display color of the display device 10. The color correction unit 121 can be realized by an image sensor. The cover 130 is pivotally connected to the color correction module 120 to selectively expose or cover the color correction unit 121. The combiner 140 is disposed on the cover 130, and the combiner 140 is connected to the display device 10 when the cover 130 exposes the color correction unit 121 (the color calibrator 100 is in an open state). Thus, without using any additional connector, the color calibrator 100 can be connected to the display device 10 through the combiner 140 of the color calibrator 100 to correct the display color of the display device 10 as indicated in FIG. 3. Thus, the color calibrator 100 can selectively omit the clump weight and the connection wire connected thereto to improve the storage performance of the color calibrator 100.

As indicated in FIG. 1B, the lens 150 of the color calibrator 100 is disposed on the casing 105 and is opposite to the color correction unit 121, such that the display color light of the display device 10 can be transmitted to the color correction unit 121 through the lens 150.

As indicated in FIG. 1B, the control module 110 and the color correction unit 120 are integrated or work together. The control module 110 is used to control the color correction module 120. For example, the control module 110 and the color correction module 120 both are disposed in the casing 105, and are electrically connected to each other through at least one wire. Since the control module 110 and the color correction module 120 are integrated or are disposed in the same casing 105, the color correction function of the color correction module 120 can be performed through the control module 110 of the color calibrator 100 without using any additional operating device such as a computer.

As indicated in FIGS. 1A and 1B, the control module 110 includes a control unit 111 and a user interface 112 electrically connected to the control unit 111. The user interface 112 provides at least one trigger unit 1121, such as a physical key or a virtual key. The function of the control unit 111 for operating the color correction module 120 can be controlled through the user interface 112. For example, one of the trigger units 1121 can be triggered to perform the color correction function. The trigger unit 1121 provides a hot key or a function key. In an embodiment, the user interface 112 can be realized by an on-screen display (OSD) system. When the color correction function is not performed (for example, the cover 130 is in a closed state or the color correction function is switched through the trigger unit 1121), the color calibrator 100 is coupled to the display device 10, such that the display device 10 can be operated through the user interface 112 to adjust the display parameter. When the cover 130 is in an open state, the color calibrator 100 automatically switches to a color correction mode, or the color correction function can be switched through the trigger unit 1121.

In another embodiment, with suitable adjustment in the design of the control module 110, the color calibrator 100 also can provide mouse function when the color calibrator 100 is in a closed state (as indicated in FIG. 1A).

As indicated in FIG. 2A, the casing 105 and the cover 130 are connected through a pivoting mechanism 115. The pivoting mechanism 115 can be disposed on the cover 130 or the casing 105. Thus, when the casing 105 and the cover 130 rotate with respect to each other around the rotation axis S1 of the pivoting mechanism 115, the color calibrator 100 can selectively be in an open state (as indicated in FIG. 2A) or a closed state (as indicated in FIG. 1A). When the color calibrator 100 is in an open state, the color calibrator 100 can expose the color correction unit 121 to correct the display color. When the color calibrator 100 is in a closed state, the color calibrator 100 can cover and protect the color correction unit 121.

As indicated in FIG. 2A, when the color calibrator 100 is in an open state, the color correction unit 121 faces towards a correction direction S2, which is substantially perpendicular to the rotation axis S1. When the casing 105 rotates around the rotation axis S1, the correction direction S2 will rotate around the rotation axis S1. In another embodiment, with suitable adjustment in the design and/or position of the pivoting mechanism 115, the correction direction S2 and the rotation axis S1 can be substantially parallel to each other, and the casing 105 the cover 130 can laterally side with respect to each other to selectively expose or cover the color correction unit 121.

As indicated in FIGS. 2A and 3, the first anti-slip pad 160 is disposed on the casing 105. When the combiner 140 of the color calibrator 100 is connected to the display device 10, the first anti-slip pad 160 can contact the display surface 12s of the display device 10, such that relative sliding between the first anti-slip pad 160 and the display surface 12s can be reduced or even avoided. The first anti-slip pad 160 can be formed of a soft material such as plastics or rubber, which causes less damage to the display surface 12s.

As indicated in FIG. 2A, the cover 130 includes a bottom plate 131 and a side plate 132 connected to the bottom plate 131, wherein the side plate 132 forms or surrounds an accommodation space 132r. The combiner 140 includes a fastener 141 and a sliding component 142 slidably connected to the fastener 141. The fastener 141 is fixed in the accommodation space 132r. For example, the fastener 141 is fixed on the bottom plate 131 of the cover 130. The side plate 132 has an opening 132a, through which the sliding component 142 can enter or exit the accommodation space 132r.

As indicated in FIG. 2A, the fastener 141 has multiple first positioning portions 1411, and the sliding component 142 has multiple second positioning portions 1421, wherein at least one of the second positioning portions 1421 can be engaged with at least one corresponding first positioning portion 1411. Thus, the fastener 141 and the sliding component 142 will not be easily separated from each other. In another embodiment, the quantity of first positioning portions 1411 is multiple, but the quantity of second positioning portion 1421 is only one; or, the quantity of second positioning portions 1421 is multiple, but the quantity of first positioning portion 1411 is only one.

As indicated in FIG. 2A, each first positioning portion 1411 can be realized by an engaging hole, and each second positioning portion 1421 can be realized by an elastic piece. Due to the flexibility of the elastic piece, when a suitable force is applied to the elastic piece or the sliding component 142, the elastic piece will be detached from the engaging hole. When the elastic piece is detached from the engaging hole, the fastener 141 and the sliding component 142 can slide with respect to each other to adjust the protruded length L1 by which the sliding component 142 protrudes over the cover 130. After the protruded length L1 is confirmed, the applied force is released, such that the elastic piece bounces back, and the fastener 141 and the sliding component 142 restore the engaged state.

As indicated in FIG. 2B, the sliding component 142 has an upper surface 142u, and each second positioning portion 1421 protrudes from the upper surface 142u and has a bevel 1421s. The bevel 1421s, having an angle A1 being an acute angle with respect to the upper surface 142u, reduces the resistance encountered by the sliding component 142 when sliding towards the inside of the cover 130, and makes it easier for the sliding component 142 to slide towards the inside of the cover 130. Each second positioning portion 1421 has a stopping surface 1421b. When the first positioning portions 1411 and the second positioning portions 1421 are engaged together, the stopping surface 1421b will be stopped by the inner sidewall 1411s of the first positioning portions 1411 to avoid the first positioning portions 1411 and the second positioning portions 1421 being separated from each other easily. In an embodiment, the stopping surface 1421b has an angle A2 with respect to the upper surface 142u. The angle A2 can be a right angle or can be larger than 90°. Since the stopping surface 1421b will be stopped by the inner sidewall 1411s, when the combiner 140 is connected on the display device 10, as indicated in FIG. 3, the color correction module 120 will not be offset downwardly.

As indicated in FIG. 2A, the fastener 141 has a first chute 141r1 and a second chute 141r2. Multiple first positioning portions 1411 are located between the first chute 141r1 and the second chute 141r2. The sliding component 142 has a first slider 1422 and a second slider 1423, which respectively are slidably connected to the first chute 141r1 and the second chute 141r2. When the first positioning portions 1411 and the second positioning portions 1421 are detached from each other, the first slider 1422 and the second slider 1423 can slide with respect to the first chute 141r1 and the second chute 141r2 respectively, such that the fastener 141 and the sliding component 142 can slide with respect to each other.

As indicated in FIG. 2A, the combiner 140 can slide with respect to the cover 130 along a stretching direction S3, wherein the correction direction S2, the rotation axis S1 and the stretching direction S3 are perpendicular to each other. As indicated in the diagram, when the color calibrator 100 is in an open state, the correction direction S2, the rotation axis S1 and the stretching direction S3 are perpendicular to each other.

As indicated in FIG. 2A, the sliding component 142 further has a connection portion 1424. The connection portion 1424 and the pivoting mechanism 115 respectively are located on two opposite sides of the cover 130. When the sliding component 142 extends outwards with respect to the cover 130, the connection portion 1424 will move away from the pivoting mechanism 115, and the distance between the connection portion 1424 and the pivoting mechanism 115 (or the color correction unit 121) will be increased accordingly. Thus, the correction position of the color correction unit 121 can be adjusted.

As indicated in FIG. 2A, the angle A3 of the connection portion 1424 with respect to the upper surface 142u is such as 90°. However, the angle A3 can also be an acute angle or an obtuse angle. When the cover 130 covers the color correction unit 121, as indicated in FIG. 1A, the connection portion 1424 is close to the opening 132a to prevent external impurities from entering the cover 130 through the opening 132a. In an embodiment, the connection portion 1424 and the opening 132a both are a polygon, such as a rectangle. However, the connection portion 1424 and the opening 132a can both be a circle or an ellipse.

In an embodiment, the thickness of the connection portion 1424 of FIG. 1A can be increased, such that the connection portion 1424 can be partly located inside the opening 132a to prevent external impurities from entering the cover 130 through the opening 132a. In the present embodiment, the shape of the connection portion 1424 substantially matches that of the opening 132a, such that the gap between the connection portion 1424 and the opening 132a can be reduced. When the connection portion 1424 is partly located inside the opening 132a, the connection portion 1424 almost or completely seals the opening 132a to prevent external impurities from entering the cover 130 through the opening 132a.

As indicated in FIG. 3, when the color calibrator 100 is in an open state, the connection portion 1424 can be hanged at the top 11u of the outer casing 11 of the display device 10, and the color correction unit 121 of the color correction module 120 can correct the display color of the display panel 12 of the display device 10. According to this connection design, the connection portion 1424 is a hanging portion of the color calibrator 100.

Refer to FIG. 3. Since the sliding component 142 and the fastener 141 (illustrated in FIG. 2A) can slide with respect to each other, the position of the connection portion 1424 is adjustable. When the connection portion 1424 is connected to the display device 10, the position of the color correction unit 121 relative to the display device 10 can be adjusted. Furthermore, since the position of the connection portion 1424 is adjustable, the protruded length L1 by which the sliding component 142 protrudes over the cover 130 can be adjusted. Thus, the color correction unit 121 can correct the display color of the display panel 12 at different heights. For example, when the angle A3 of the connection portion 1424 with respect to the upper surface 142u matches the angle of the top 11u of the outer casing 11 of the display device 10, the connection portion 1424 can be firmly connected to the top 11u of the outer casing 11 of the display device 10. Additionally, when the shape of the connection portion 1424 matches the shape of the top 11u of the outer casing 11, the connection portion 1424 can be firmly connected to the top 11u of the outer casing 11. For example, the connection portion 1424 has a hook structure for hanging at the top 11u of the outer casing 11.

As indicated in FIG. 1B, the connection portion 1424 has a recess 1424r, in which the second anti-slip pad 170 is disposed. As indicated in FIG. 3, when the connection portion 1424 is connected to the top 11u of the outer casing 11 of the display device 10, the second anti-slip pad 170 can contact the top 11u to avoid the color calibrator 100 sliding off the display device 10 and enhance the stability of connection between the color calibrator 100 and the display device 10. As indicated in FIG. 1B, the casing 105 has a round angle R1, and the end portion 1424a of the connection portion 1424 is close to or even leans on the round angle R1, such that the length L2 of the connection portion 1424 can be increased further. As indicated in FIG. 3, when the connection portion 1424 is connected to the top 11u of the outer casing 11 of the display device 10, the contact length, by which the connection portion 1424 contacts the top 11u, can be increased to enhance the stability of connection between the color calibrator 100 and the display device 10. Furthermore, the second anti-slip pad 170 can be formed of a material similar or identical to that of the first anti-slip pad 160, and similar descriptions are not repeated here.

Figure 4:
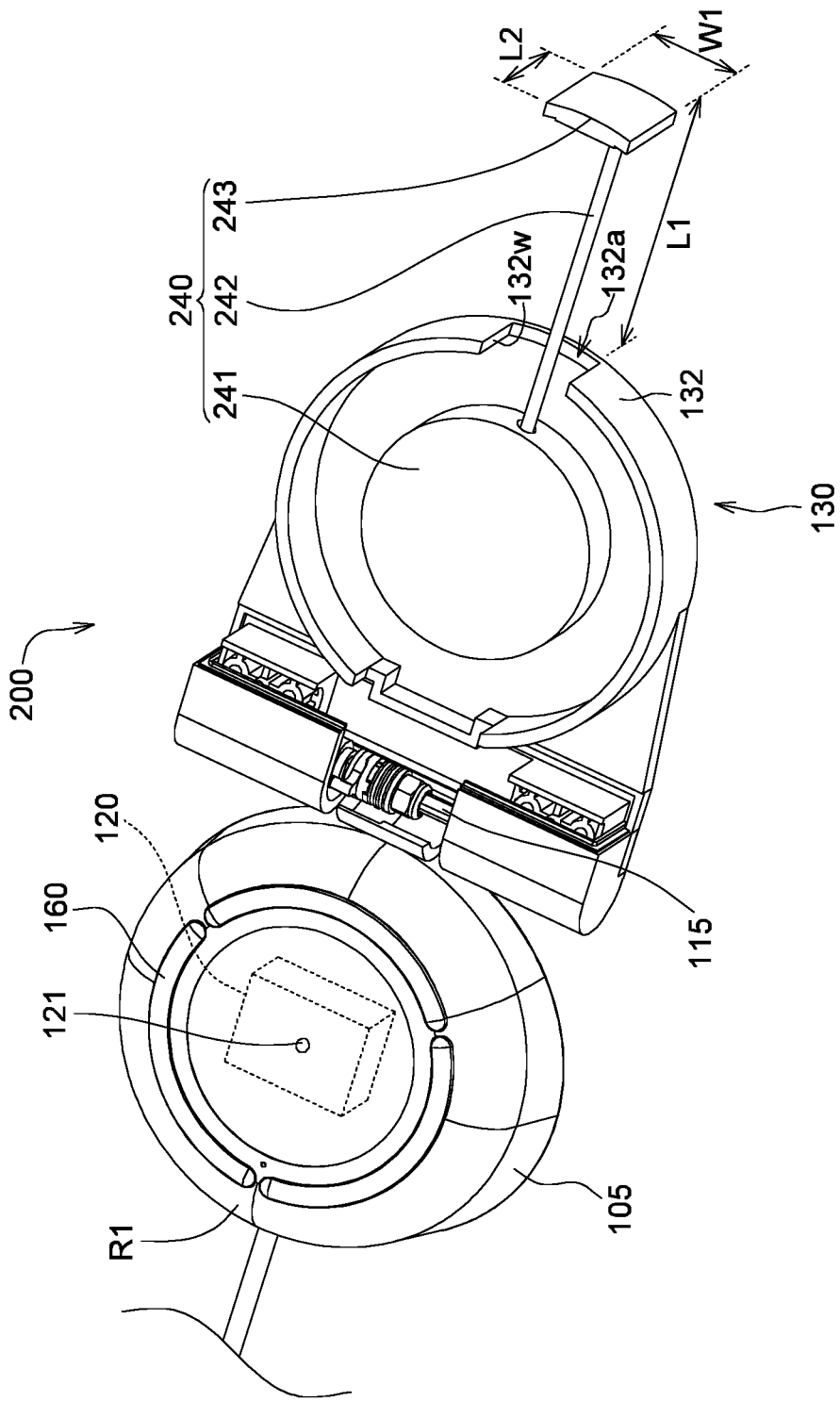
FIG. 4 is a schematic diagram of a color calibrator according to another embodiment of the present disclosure.

FIG. 4 is a schematic diagram of a color calibrator 200 according to another embodiment of the present disclosure. The color calibrator 200 includes a casing 105, a control module 110 (not illustrated), a color correction module 120, a cover 130, a combiner 240, a lens 150 (not illustrated), a first anti-slip pad 160 and a second anti-slip pad 170 (not illustrated). The features of the color calibrator 200 are similar or identical to that of the color calibrator 100, but are different in that the combiner 240 of the color calibrator 200 is an elastic stretchable piece.

The combiner 240 includes a drive mechanism 241, a stretchable wire 242 and a connection portion 243. The stretchable wire 242 connects the drive mechanism 241 and the connection portion 243. When the stretchable wire 242 is pulled, the protruded length L1, by which the connection portion 243 protrudes over the cover 130, can be increased. When the stretchable wire 242 is released, the drive mechanism 241 automatically retracts the stretchable wire 242 by using an elastic mechanism, such that the connection portion 243 returns to seal the opening 132a. In an embodiment, the sidewall 132w of the opening 132a has a taper (not illustrated), and when the connection portion 243 returns to the opening 132a, the connection portion 243 will be stopped by the sidewall 132w and will not be bounced to the inside of the cover 130.

Figure 5A:
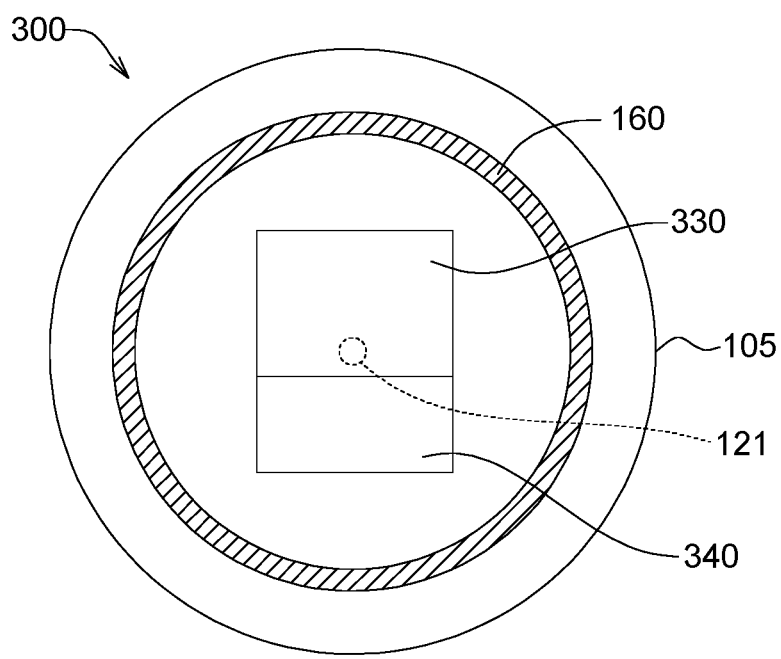
FIG. 5A is a schematic diagram of a color calibrator in a closed state according to another embodiment of the present disclosure.
Figure 5B:
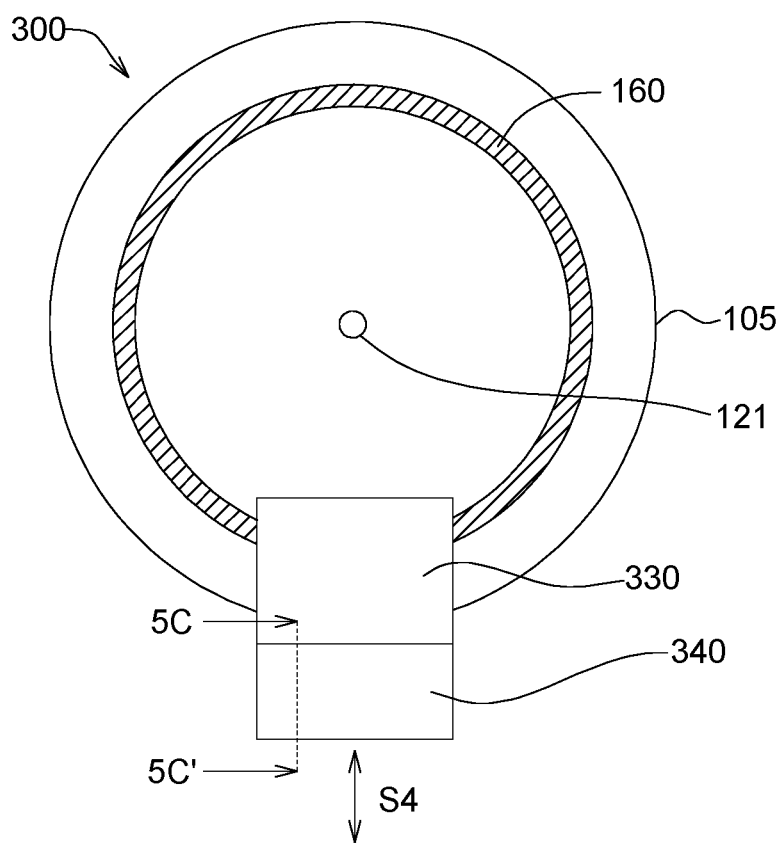
FIG. 5B is a schematic diagram of the color calibrator of FIG. 5A in an open state.
Figure 5C:
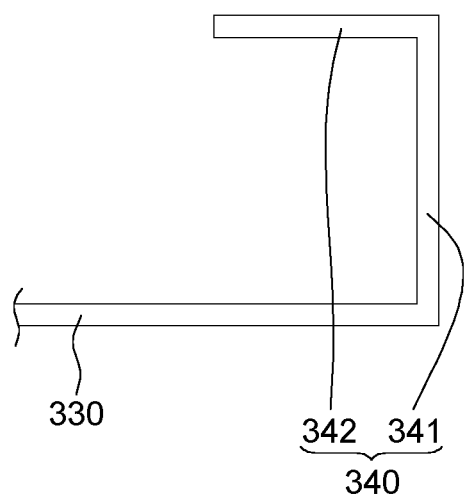
FIG. 5C is a cross-sectional view of the cover and the combiner of FIG. 5B along a direction 5C-5C'.

In another embodiment, the width W1 of the connection portion 243 can be increased, such that when the connection portion 243 is bounced back, the connection portion 243 will be stopped by the side plate 132 and will no more slide to the inside of the opening 132a. Given that the connection portion 243 protrudes outwards with respect to the opening 132a, even when the length L2 of the connection portion 243 is increased, the connection portion 243 still does not interfere with the round angle R1 of the casing 105 (when the cover 130 is in a closed state). As the length L2 of the connection portion 243 is increased, the stability of the connection portion 243 hanged at the top 11u of the outer casing 11 of the display device 10 (illustrated in FIG. 3) will be enhanced. Refer to FIGS. 5A~5C. FIG. 5A is a schematic diagram of a color calibrator 300 in a closed state according to another embodiment of the present disclosure. FIG. 5B is a schematic diagram of the color calibrator 300 of FIG. 5A in an open state. FIG. 5C is a cross-sectional view of the cover 330 and the combiner 340 of FIG. 5B along a direction 5C-5C'.

The color calibrator 300 includes a casing 105, a control module 110 (not illustrated), a color correction module 120 (not illustrated), a cover 330, a combiner 340, a lens 150 (not illustrated), and a first anti-slip pad 160. The features of the color calibrator 300 are similar or identical to that of the color calibrator 100, but are different in that the cover 330 and the casing 105 of the color calibrator 300 can slide with respect to each other along the sliding direction S4 to selectively expose or cover the color correction unit 121.

As indicated in FIG. 5C, the combiner 340 includes a connection portion 341 and a closed portion 342. The connection portion 341 connects the cover 330 and the closed portion 342. In the present embodiment, the connection portion 341, the cover 330, and the closed portion 342 can be integrally formed in one piece, but the present embodiment is not limited thereto. The connection portion 341, the cover 330, and the closed portion 342 form a hook structure. When the color calibrator 300 is in an open state, the color calibrator 300 can be engaged with the bottom 11b (illustrated in FIG. 3) of the outer casing 11 of the display device 10 through the hook structure to correct the display color of the display panel 12. In an embodiment, the hook structure and the bottom 11b of the outer casing 11 are tightly engaged, such that the color calibrator 300 and the outer casing 11 will not be easily separated from each other.

In another embodiment, the combiner 340 can be realized by a first engagement portion, and the outer casing 11 of the display device 10 has a second engagement portion, wherein the combiner 340 and the outer casing 11 can be fixed with each other when the first engagement portion and the second engagement portion are engaged together. In an embodiment, the first engagement portion can be realized by one of a protruded portion and an indented portion, and the second engagement portion can be realized by the other one of the protruded portion and the indented portion.

To summarize, the present embodiment provides a color calibrator, including a color correction module, a cover and a combiner. The cover the color correction module can rotate or slide with respect to each other to selectively expose or cover the color correction unit of the color correction module. When the cover exposes the color correction unit (open state), the combiner can be connected to the display device for correcting the display color displayed on the display panel of the display device. For example, the combiner can be hanged at the top of the casing of the display device or can be connected to the bottom of the casing. In an example, the combiner can be realized by a stretchable component, and the correction position of the color correction unit relative to the display panel can be adjusted through the adjustment in the connection portion of the color correction unit relative to the combiner. Thus, the storage performance of the color correction module can be assured, and when the color correction module is in an open state, the combiner can further enhance the stability of the connection between the color correction unit and the display panel to assure the correction effect of the display color.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A color calibrator used to correct a display color of a display device, and comprises:
   a color correction module comprising a color correction unit for correcting the display color;
   a cover connected to the color correction module to selectively expose or cover the color correction unit; and
   a combiner disposed on the cover, wherein the combiner is connected to the display device when the cover exposes the color correction unit,
   wherein the combiner further comprises a hanging portion hanged at a top of the display device, wherein the cover is pivotally connected to the color correction module through a pivoting mechanism, and the hanging portion and the pivoting mechanism respectively are located on two opposite sides of the cover.

2. The color calibrator according to claim 1, wherein position of the hanging portion is adjustable for adjusting position of the color correction unit relative to position of the display device.

3. The color calibrator according to claim 1, further comprising:
   a control module integrated with the color correction module and used to control the color correction module,
   wherein the control module comprises a control unit and a user interface electrically connected to the control unit, the user interface has at least one trigger unit, and a function of the control unit for operating the color correction module is controlled through the at least one trigger unit.

4. The color calibrator according to claim 1, wherein the combiner is a stretchable component used to adjust position of the color correction unit relative to position of the display device.

5. The color calibrator according to claim 1, wherein the color correction unit is toward a correction direction, the cover and the color correction module rotate around a rotation axis, and the correction direction and the rotation axis are substantially perpendicular to each other.

6. The color calibrator according to claim 1, wherein the cover and the color correction module respectively rotate around a rotation axis, and the combiner is slidably disposed on the cover along a stretching direction perpendicular to the rotation axis.

7. The color calibrator according to claim 1, further comprises:
   a casing having a round angle;
   wherein the combiner comprises a sliding component having a connection portion, and an end portion of the connection portion is close to the round angle.

8. The color calibrator according to claim 1, wherein the combiner comprises:
   a fastener fixed on the cover, wherein the fastener has a plurality of first positioning portions; and
   a sliding component slidably connected to the fastener, wherein the sliding component has a plurality of second positioning portions, and at least one of the second positioning portions is correspondingly engaged with at least one of the plurality of first positioning portions.

9. A color calibrator used to correct a display color of a display device, and comprises:
   a color correction module comprising a color correction unit for correcting the display color;
   a cover connected to the color correction module to selectively expose or cover the color correction unit; and
   a combiner disposed on the cover, wherein the combiner is connected to the display device when the cover exposes the color correction unit,
   wherein the combiner comprises:

a fastener fixed on the cover, wherein the fastener has a plurality of first positioning portions; and a sliding component slidably connected to the fastener, wherein the sliding component has a plurality of second positioning portions, and at least one of the second positioning portions is correspondingly engaged with at least one of the plurality of first positioning portions.

10. The color calibrator according to claim 9, wherein each of the plurality of first positioning portions is an engaging hole, and each of the plurality of second positioning portions is an elastic piece.

11. The color calibrator according to claim 9, wherein the fastener has a first chute and a second chute, the plurality of first positioning portions are located between the first chute and the second chute, the sliding component has a first slider and a second slider, the first slider is slidably connected to the first chute, and the second slider is slidably connected to the second chute.

12. The color calibrator according to claim 9, wherein the cover comprises a bottom plate and a side plate connected to the bottom plate, the side plate surrounds an accommodation space within which the fastener is fixed, and the side plate has an opening through which the sliding component enters and exits the accommodation space.

13. The color calibrator according to claim 12, wherein the sliding component further has a connection portion, and the connection portion is located in the opening when the cover covers the color correction unit.

14. The color calibrator according to claim 13, wherein shape of the connection portion substantially matches that of the opening.

15. A color calibrator used to correct a display color of a display device, and comprises:
a color correction module comprising a color correction unit for correcting the display color;
a cover connected to the color correction module to selectively expose or cover the color correction unit;
a combiner disposed on the cover, wherein the combiner is connected to the display device when the cover exposes the color correction unit, wherein the combiner further comprises a hanging portion hanged at a top of the display device, wherein the cover is pivotally connected to the color correction module through a pivoting mechanism, and the hanging portion and the pivoting mechanism respectively are located on two opposite sides of the cover;
a casing; and
a first anti-slip pad disposed on the casing;
wherein when the combiner of the color calibrator is connected to the display device, the first anti-slip pad contacts a display surface of the display device.

16. A color calibrator used to correct a display color of a display device, and comprises:
a color correction module comprising a color correction unit for correcting the display color;
a cover connected to the color correction module to selectively expose or cover the color correction unit;
a combiner disposed on the cover, wherein the combiner is connected to the display device when the cover exposes the color correction unit,
a casing;
a first anti-slip pad disposed on the casing, wherein when the combiner of the color calibrator is connected to the display device, the first anti-slip pad contacts a display surface of the display device; and
a second anti-slip pad;
wherein the combiner comprises a fastener and a sliding component slidably connected to the fastener; the sliding component has a connection portion having a recess in which the second anti-slip pad is disposed.

17. The color calibrator according to claim 16, wherein the combiner further comprises a hanging portion hanged at a top of the display device, wherein the cover is pivotally connected to the color correction module through a pivoting mechanism, and the hanging portion and the pivoting mechanism respectively are located on two opposite sides of the cover.

* * * * *